(12) United States Patent
Gauthier et al.

(10) Patent No.: US 7,172,733 B2
(45) Date of Patent: Feb. 6, 2007

(54) DEVICE FOR INJECTION OF HYDROCARBONS INTO A FLUIDIZED CHAMBER

(75) Inventors: Thierry Gauthier, Brignais (FR); Patrick Leroy, Le Havre (FR); Abdelhakim Koudil, Lyons (FR); Ludovic Raynal, Oullins (FR)

(73) Assignee: Institut Francais du Petrole, Rueil-Malmaison, Cedex (FR)

( * ) Notice: Subject to any disclaimer, the term of this patent is extended or adjusted under 35 U.S.C. 154(b) by 436 days.

(21) Appl. No.: 10/429,952

(22) Filed: May 6, 2003

(65) Prior Publication Data
US 2004/0062689 A1 Apr. 1, 2004

(30) Foreign Application Priority Data
May 6, 2002 (FR) .................... 02 05665

(51) Int. Cl.
*B32B 27/04* (2006.01)
*F27B 15/14* (2006.01)

(52) U.S. Cl. .................. 422/145; 422/140; 239/398; 239/590; 239/597

(58) Field of Classification Search .............. 422/140, 422/145, 224; 239/398, 590, 597
See application file for complete search history.

(56) References Cited

U.S. PATENT DOCUMENTS

| | | | | |
|---|---|---|---|---|
| 4,793,913 A | * | 12/1988 | Chessmore et al. | 208/113 |
| 5,037,616 A | * | 8/1991 | Williatte et al. | 422/140 |
| 5,061,457 A | * | 10/1991 | Hsieh et al. | 422/140 |
| 5,173,175 A | * | 12/1992 | Steffens et al. | 208/157 |
| 5,252,823 A | * | 10/1993 | Doty | 250/227.24 |
| 5,552,119 A | * | 9/1996 | Holmes | 422/144 |
| 5,567,141 A | * | 10/1996 | Joshi et al. | 431/8 |
| 6,454,933 B2 | * | 9/2002 | Ito et al. | 208/113 |
| 6,645,437 B1 | * | 11/2003 | Gauthier et al. | 422/139 |
| 2001/0000600 A1 | * | 5/2001 | Ito et al. | 208/113 |
| 2002/0159922 A1 | * | 10/2002 | Ito et al. | 422/139 |
| 2006/0016726 A1 | * | 1/2006 | Steffens et al. | 208/113 |

* cited by examiner

*Primary Examiner*—N. Bhat
(74) *Attorney, Agent, or Firm*—Millen, White, Zelano, Branigan, P.C.

(57) ABSTRACT

A device suitable for atomization and injection of a hydrocarbon batch into a reaction chamber comprises an admission and mixing chamber (5) for the liquid hydrocarbon batch introduced into the device by a tube (8) and for an atomization gas introduced into the device by a cylindrical casing (9) containing tube (8). Casing (9) is extended by a Venturi tube (6) which has a convergent part connected upstream to cylindrical casing (9) and a divergent part connected downstream to a hemispheric tip (7) that leads, by a rectangular slit with an opening angle (16) between about 100 and 115 degrees, to the reaction chamber. The device can be used in processes for catalytic cracking of heavy hydrocarbons.

19 Claims, 3 Drawing Sheets

DEVICE FOR INJECTION OF HYDROCARBONS INTO A FLUIDIZED CHAMBER

The invention relates to a device for atomization and injection of a hydrocarbon batch into a reaction chamber and more particularly into a reactor for catalytic cracking (FCC). Hydrocarbon batch is understood as any type of batch usually used in catalytic cracking, from distillates under vacuum often characterized by an initial boiling point of 350–380° C. and a final boiling point of 550–560° C., to batches containing so-called heavy fractions of the atmospheric residue type or residue under vacuum type, having undergone preprocessing, or mixes of these different petroleum cuts. Generally, the invention is applicable to any process needing to have the batch introduced in a state of fine droplets, while keeping an overall batch loss due to the device at less than 10 bars (1 bar=$10^5$ Pascal) and using an atomization gas such that the throughput of this atomization gas is less than 10% of the throughput of the batch to be processed.

In the catalytic cracking process, the liquid hydrocarbon batch is finely atomized in an atomization device(s) assisted by a gas (generally a vapor) and then placed in contact with the hot catalyst in the fluidized reactor, which causes its vaporization. It is then transformed into the gaseous state in this reactor with the catalyst in the form of fine solid particles, which promotes catalytic cracking reactions, reactions during which coke is also formed as a secondary reaction product, this coke being deposited on the catalyst. The effluents of the reaction are separated from the catalyst at the exit of this reactor by a primary separation element followed by one or several cyclone separator stages. After stripping, i.e., elimination, by vapor displacement, of the water from the heavy hydrocarbons adsorbed on the surface of the catalyst, the catalyst is then conveyed into a regeneration zone where the coke deposited on the catalyst is burned in the presence of oxygen. The regenerated catalyst is then reintroduced into the reactor. The process is characterized by the fact that the heat necessary for vaporization and cracking reactions is provided by the combustion of the coke on the catalyst, the catalyst conveying the heat from the regeneration zone to the reaction zone.

The processing of heavy batches in the above-defined sense corresponds to a trend in catalytic cracking that can be observed for 20 years. The heavy batches are more difficult to vaporize and it is necessary to have efficient atomization devices that make it possible, on the one hand, to form small droplets (the smaller the droplet introduced into the reactor, the shorter the vaporization time) and, on the other hand, to introduce said droplets into the reaction chamber so that the contact between the droplets and the hot catalyst is as uniform as possible. It is indeed known to one skilled in the art that the difficulty in processing heavy batches is tied, among other things, to the quality of the device for introducing the batch into the reactor. Dependent on this to a large extent is the amount of coke formed in the reactor, which must be minimized to maintain the best catalytic activity and the adiabatic nature of the process, i.e., the fact that the heat necessary for vaporization of the batch and for cracking corresponds to the heat released during regeneration.

The reactor is generally a chamber that is elongated approximately along a vertical axis, in which the gaseous effluents circulate at surface speeds generally between 0.5 and 30 m/s, the vaporization of the batch causing an increase in speed that is further accentuated by the cracking reactions, which cause molar expansion. The batch and the catalyst flow overall as co-currents, the speed of the gas being sufficient to carry along the grains of the catalyst, typically particles whose average diameter is between 20 and 150 microns, with apparent density between 1000 and 2000 kg/m$^3$. The reactor is generally an ascending flow reactor. It is thus called a riser reactor. The batch and the catalyst are introduced into the lower part of the chamber and flow upward as co-currents. It can also be envisioned to have a descending flow reactor. It is then called a downer reactor. The batch and the catalyst are then introduced into the upper part of the reactor and flow downward as co-currents.

Achieving complete and rapid vaporization before proceeding to cracking reactions is all the more difficult to achieve the heavier the batches are and thus less able to be vaporized. Reduction of the dwell time of the batch in the reactor can make it possible to achieve more favorable selectivities where intermediate products are concerned. The usual dwell times are typically about 500–5000 ms in the reactor. Therefore, it is necessary that the vaporization time be short compared to the dwell time of the batch to achieve an efficient reaction. The trend toward short dwell times of the batch in the reactor, indispensable for processing heavy batches, thus makes it absolutely necessary to use a very efficient atomization device that makes it possible to have vaporization times well below the dwell time of the batch.

The indispensable step for this vaporization is thus advance transformation of the liquid hydrocarbon batch into droplets of suitable size, so that the heat transfer between the hot catalyst coming from regeneration and said droplets happens as rapidly as possible. It is clear that it is advantageous to have droplets as small as possible so as to maximize the surface to volume ratio of said droplets and thus to accelerate their vaporization. A second aspect, just as important as atomization, is the shaping of all the droplets into a relatively thin jet that covers, as much as possible, the cross section of the reaction chamber, while taking into consideration the risks of eroding the walls of the chamber by direct contact with the droplets or with the catalyst that is carried and then accelerated by the jet. These are the two stages of transforming the liquid batch into droplets, then the shaping of the resulting jet of droplets that must be achieved by the atomization and injection device, which we will call injector from now on.

To make it possible to satisfactorily introduce the batch into the reactor and to promote contact among the droplets of the batch and the catalyst, the equally distributed batch (i.e., distributed as evenly as possible) can be introduced through numerous batch injectors, arranged laterally on the periphery of the reactor and making possible the formation of jets consisting of droplets of atomized batch and atomization gas, these jets being oriented opposite the reactor and encountering the rising catalyst flow in the case of the ascending reactor or riser, or the descending catalyst flow, in the case of the descending reactor or downer.

This method of introducing the batch is known and makes it possible to achieve satisfactory contact. It is clear that, to promote homogeneous contact between the batch and the catalyst, the jet formed at the exit of the injector must make it possible to cover well the cross section of the reactor passage. A jet in the shape of a flat beam and sufficient opening will make it possible to achieve this objective.

The concept of injectors thus aims ideally to achieve a batch of droplets that are as small as possible, and to give the jet of resulting droplets the form of a flat beam and a well-defined opening angle. The orientation of the injectors with respect to the vertical will also contribute to the efficient penetration of this jet into the interior of the reaction chamber.

Several patents already exist in the field, we give a brief analysis below:

Patent WO 00/40674 by EXXON protects an atomization process for a batch with a boiling point above 260° C. by introducing, into the liquid jet, supercooled water at a pressure higher than that of the liquid jet so as to vaporize this water. This patent does not include a precise description of the geometry of the atomization means, in particular at the exit tip or slit. It is the adding of water mixed with the batch that is supposed to promote the atomization of the latter.

Patent EP 0717 095 by SPRAYING SYSTEM describes an injector with a double slit with impact-type atomization. There is no precise description of the shape of these exit slits, about which it is said only that they are cut into a spherical cap and that they can have, between them, an angle that makes the jets convergent, divergent, or parallel.

U.S. Pat. No. 5,794,857 by SHELL describes an injector with double coaxial conduits. The first conduit is for the introduction of an atomization gas and the second circular conduit is for the introduction of the liquid hydrocarbon charge. The first conduit terminates in an approximately hemispherical tip that leads to the second annular conduit through numerous openings oriented along certain angles. The second, also hemispherical conduit, nested in the first, is itself equipped with a tip provided with at least two slits. The slits themselves are not described.

Patent EP 0 933 123 by MOBIL describes a double tube injector having a convergent part at the exit of the external tube. The liquid circulates in the circular part and the atomization gas circulates in the interior tube, which itself is enlarged toward the exit. There is no tip and the resulting mixture exits the injector through a rectangular section which is that of the end of the convergent part.

U.S. Pat. Nos. 6,010,620 and 6,156,276 by UOP describe a system intended to provide a set of parallel jets that can, in one particular case, collide with a descending catalyst curtain. The patent does not contain any description of an exit device for the injector.

U.S. Pat. Nos. 5,289,976, 5,948,241, and 5,306,418 by MOBIL and KELLOG describe a collision injector (called "impingement atomizer" in the cited text) having a tip with a slit whose defining elements are the following: the slit is cut into a hemispheric dome; the slit produces a spray with an angle between 35 and 120°, and preferably between 40 and 90°, and more preferably between 70 and 80°. The length to diameter ratio of the cylindrical tip is between 6/1 and 3/1, preferably about 4/1. It is also claimed that the ratio between the diameter of the cylindrical tip and the calibrated opening of the conduit that supplies the liquid, which is an internal cylindrical conduit, is between 2/1 and 6/1, preferably around 4/1. This patent does not provide a precise geometric description of the slit.

Patent FR 87 14194 by TOTAL provides a description of an injector with a Venturi tube without a primary atomization effect and characterizes the Venturi tube by the fact that the hydrocarbon batch and the atomization gas circulate at the throat under sonic conditions, and by the fact that the convergent part and the divergent part are connected to the throat by connections with a curved profile, further with an angle less than 15° for the connection between the convergent part and the throat and an angle less than 5° for the connection between the throat and the divergent part. Concerning the exit device, this patent describes a tip having an exit slit whose surface area must be between 1 and 10 times, preferably between 2 and 5 times, the cross section of the throat. The slit is cut along a diameter and occupies a sector of this diameter whose angle is between 60 and 90°. No description of the geometry of the slit itself is given, in particular regarding its shape, more precisely the width to length ratio.

Generally, it can be said that the various injection devices described in the prior art do not develop the geometric aspect of the exit element which, however, plays a fundamental role in the shaping of the jet. In U.S. Pat. Nos. 5,289,976 and 5,948,241, the atomization is achieved according to the principle of collision of the liquid batch with an obstacle, while in the case of this invention, this atomization is achieved by shearing a film of liquid using an atomization gas. It has been shown experimentally that there is a synergistic effect, different from other types of injectors, between this method of atomization and the geometry of the tip such as it will be described in the following text.

Indeed, the Venturi tube as described in patent FR 87 14194 makes it possible, in contrast to other atomization systems, to completely atomize the batch, which then flows into the divergent part. With a Venturi-type atomization system, the tip has, as its only function, to shape the jet of already-formed droplets, while in the other systems described in the literature, notably atomization by collision with a target, the atomization of the batch is achieved partly in this collision step, partly in the tip itself.

The use of a Venturi injector, functioning under appropriate atomization conditions, combined with a tip that makes it possible to shape the flow, is thus particularly advantageous:

loss of the batch due to flowing into the tip is less than that of an identical tip placed downstream from a device for partial atomization, for example of the collision type, in which the flow, besides being shaped, generally undergoes a secondary atomization that consumes energy.

the decoupling of the atomization function by the Venturi tube and the shaping in the tip makes it possible, in case of severe erosion of the tip due, for example, to flow of a particularly abrasive catalyst near said tip, not to lose the "atomization" function of the Venturi tube, and thus to continue to inject the finely atomized batch, which limits the performance loss of the unit in comparison with other atomization systems in which the tip makes a contribution to the atomization. Further, the significant distance between the tip and the Venturi tube, themselves separated by the divergent part in which the flow is perfectly homogeneous, prevents any recirculation phenomenon, i.e., the return of flow in the form of recirculation loops, and thus protects the heart of the atomization device, i.e., the Venturi tube itself.

There is also European patent EP 0 312 428 A1, which describes a Venturi tube injection system with a tip with an opening angle between 60 and 90°, French patent 2 644 795, which describes a Venturi tube injection system with a tip with an opening angle between 20° and 100°, and preferably between 40 and 90°. These patents give no technical teachings about the distribution quality of the atomized jet, or about the influence of the opening angle on this distribution quality or erosion phenomena.

One of the objects of the invention is to remedy the drawbacks of the prior art and to improve the distribution quality of the atomized jet, without risking erosion of the device.

More precisely, the invention relates to a device for atomization and injection of a hydrocarbon batch into a reaction chamber, comprising:

an entry and mixing chamber (5) for the liquid hydrocarbon batch introduced into the device through a tube (8), inside chamber (5), and for an atomization gas introduced into circular part (9) of chamber (5) through a conduit (18), a Venturi tube (6) having, in the flow direction of the fluids, a convergent part (10) connected to circular part (9), a throat (13) connected upstream to convergent part (10) and downstream to a divergent part (14), said divergent part (14) itself being connected at its downstream end to a hemispheric tip (7) characterized in that the tip has a rectangular slit (16) cut along a diameter of the tip, making it possible to inject, into the reaction chamber, the liquid hydrocarbon mixture in a state of droplets, and atomization gas, said slit (16) having an opening angle alpha along the largest dimension of said rectangle, between 100 and 115°.

The invention also makes it possible, as will be explained later, to use the above-mentioned device to simultaneously obtain an atomization jet with a large opening angle alpha between 100 and 115°, and preferably between 105° and 113°, without risking erosion, notably by the entry of catalytic particles into this device, this device achieving the atomization and injection of a hydrocarbon batch into a catalytic cracking reactor. The invention can also achieve a triple technical effect: it can achieve a better-distributed atomization (more homogeneous in the directions of the jet), distributed along a large opening angle, and without risking erosion, notably by the entry of catalytic particles into the device.

BRIEF DESCRIPTION OF THE DRAWINGS

The invention will be better understood by looking at the accompanying diagrams, among which are.

This invention makes it possible to achieve atomization and injection of a hydrocarbon batch with a final boiling point able to go up to 750° C. by supplying to the reaction chamber a beam of very fine droplets with a relatively tight granulometric distribution and in a form characterized by a jet thickness and an opening angle of this jet. The invention is particularly well adapted to injection of heavy batches in catalytic cracking, but also relates to any applications in which a liquid batch must be finely atomized and vaporized upon contact with solid granular matter in a fluidized state.

Figures 1, 1A:
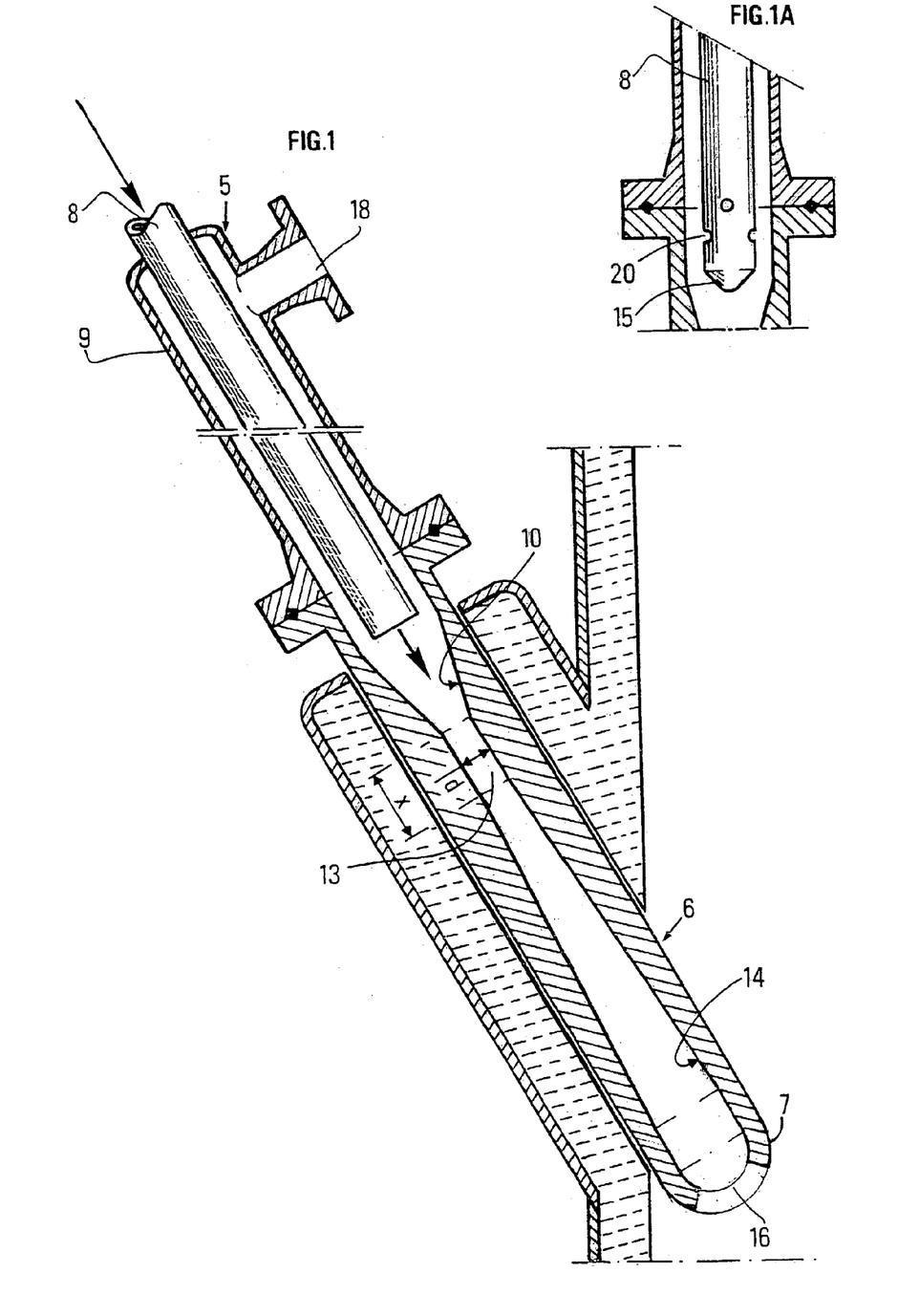
FIG. 1 is a view of the entire injector oriented downward.
FIG. 1a illustrates a variant in which the batch exits laterally. This figure is not limiting in any way and the injector, in other configurations, can be oriented upward.

According to accompanying FIG. 1, the invention comprises an entry and mixing chamber (5) for the liquid batch, which is introduced into the chamber through a tube (8) inside said chamber (5), and of an atomization gas that is introduced into chamber (5) through a conduit (18) that leads into casing (9) of chamber (5). A Venturi tube (6) having, in the direction of fluid flow, a convergent part (10), a throat (13), and a divergent part (14), is placed as an extension to chamber (5) in the direction of fluid flow. It is connected, on the one hand, to said chamber by its convergent part (10) and it is connected, on the other hand, to a tip (7) by its divergent part (14). Tip (7), shaped hemispherically, has at least one exit opening (16) shaped like a rectangular slit cut along the diametral part of the tip and characterized by its opening angle alpha in the largest dimension of the rectangle. This angle alpha will generally be between 100 and 115°, and preferably between 105 and 113°.

The injector is generally inclined and empties, via wall, into the interior of the reaction chamber (riser) at an angle which, relative to the horizontal, is between −80° and +80°, preferably between −70° and +70°.

Generally, the ratio between the atomization gas throughput and the throughput of the batch to be processed will be between 1 and 10%, preferably between 2 and 7%, and more particularly between 2 and 5% for batches that are easily vaporized, of the distillate type under vacuum, and preferably between 5 and 7% for batches containing heavier fractions, such as atmospheric residues or residues under vacuum.

According to a characteristic of the device, the entry of the gas into entry and mixing chamber (5) can be lateral, preferably radial. According to another embodiment, it can be approximately parallel to the axis of this chamber. The convergent part and the divergent part of the Venturi tube can be connected seamlessly by a curved profile. It has been observed in any case that, by placing an approximately cylindrical throat (13) between convergent part (10) and divergent part (14) and of appropriate length, the natural angle of the jet of droplets downstream from the throat would be closed, for example, from a value of 20–25° to a value of 7–10°. Length (x) of the throat of Venturi tube (13) will generally be between 0.5 and 10 times its diameter (d) and preferably between 4 and 6 times its diameter (d). It is advantageous to define an angle of the divergent part with respect to the axis of the Venturi tube that is approximately that of the jet at the exit of the throat, for example 3 to 10 degrees. The risk of recondensation of the droplets in the divergent part or downstream from the divergent part by contact of droplets with the walls is thus reduced. Considering the throughputs that are usually processed in FCC units, the throat of the Venturi tube generally has a diameter between 2 and 10 cm and preferably between 3 and 5 cm, depending on the batch to be processed. The ratio between diameter (d) of the throat of Venturi tube and the internal diameter of the injector (i.e., the internal diameter of circular space (9)) is generally between 0.4 and 0.55 and preferably between 0.45 and 0.5.

Central tube (8) has an opening at its downstream end (with respect to the flow direction of the fluid), located near the entry to convergent part (10). According to a variant, it will be advantageous if exit openings (20) of tube (8) are located on the periphery of the tube, near its downstream end, so as to make the hydrocarbon batch exit in a direction that is approximately perpendicular to the axis of the Venturi tube, which will have the effect of creating a shearing effect by the atomization gas flowing through circular space (9). In this case, the end of tube (8) is closed by a plug (15).

The injector according to the invention is attached in the usual way to the wall of the reactor by a sleeve with a thermal insulator between the injector and the sleeve.

Numerous, generally identical, injectors can be placed symmetrically on the periphery of the reaction chamber, making an angle, with respect to the horizontal, that can be between −80° and +80° and preferably between −70° and +70°. The angles are considered positive below the horizontal and negative above the horizontal. In certain cases, it will be possible to place the injectors along several planes. This is the case, for example, within the scope of the FCC, when a first series of injectors is for the batch and a second series of injectors, of a size different from the first and located on a plane that is above the first, is for recycling a cut. The injectors will be called co-current particle flow for all angles between 0 and 80° in the case of riser flow, and for all angles from 80 to 0° for downer flow. They will be called counter-current flow for all angles between 0 and −80° in the case of riser flow and for all angles between 0 and 80° for downer flow.

A refractory plugging material can be inserted above or below exit slit (16) of tip (7) extending divergent part (14) depending on whether the injector is placed in a co-current or counter-current position relative to the particle flow, so as to prevent catalyst recirculation zones, which are deleterious from the point of view of the chemical reaction and also constitute possible erosion zones vis a vis the reactor walls. For the same reasons, refractory material, cement for example or mineral wool, can be inserted between the various injectors so as to seal off zones that are not accessible to the batch.

The operating conditions that make it possible for the injector to function well are the following:

The liquid hydrocarbon batch is generally introduced into tube (8) in an approximately axial direction, i.e., along the axis of the injector itself.

the atomization gas is usually introduced into circular space (9) along an axis approximately perpendicular to the axis of the injector.

the mass flow rate of liquid at the throat of the Venturi tube, relative to the cross section of this throat, is advantageously between 1000 and 10000 Kg/s/M$^2$, and preferably between 4000 and 6000 Kg/s/M$^2$, with gas throughput to liquid throughput ratios between 1 and 10%, preferably between 2 and 7%.

Figure 2A:
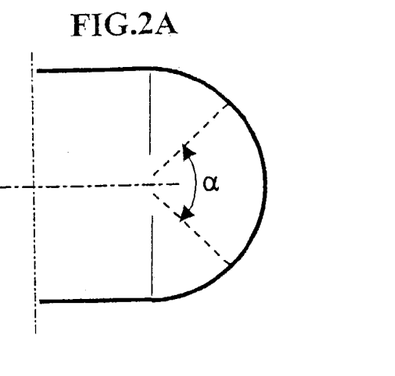
FIG. 2 gives a representation of the tip viewed from above, viewed from the front, and viewed from the side. These three views make it possible to bring out the main geometric parameters of the tip, namely, opening angle alpha of the slit, slit length (L), slit width (e) and lateral penetration (p).
Figure 2B:
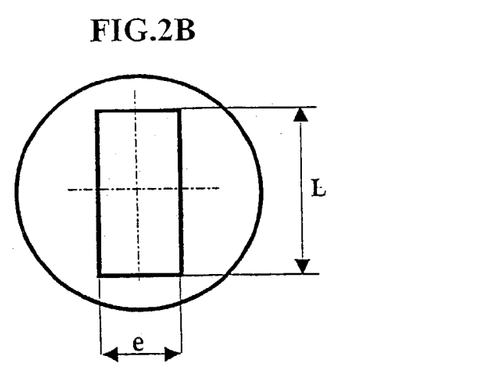
Figure 2C:
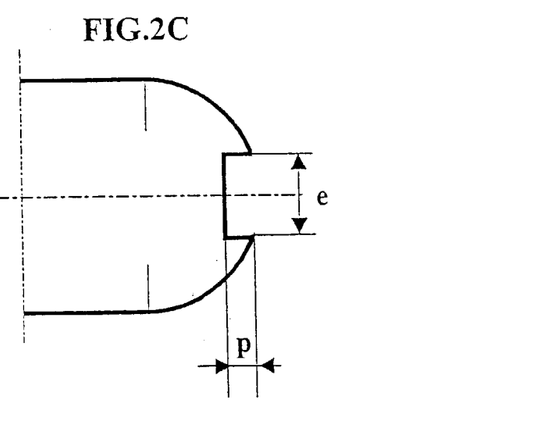

Tip (7) consists of a hemispherical cap with approximately constant thickness, pierced along a diameter by a slit (16) with rectangular projection, characterized by a width to length ratio that can be between 0.1 and 0.55, preferably between 0.2 and 0.5. Width (e) is called the smallest dimension and length (L) the largest of these two dimensions. The e/L ratio depends on the quantity of liquid processed in the device. The edges of the slit, i.e., those of smallest dimension (e), will be cut in the thickness of the cap so as to form an angle (alpha) whose vertex will be approximately aligned with the center of the hemisphere. The diameter along which the slit is pierced will be a diameter that is approximately horizontal to the direction in which, if the injector is turned around its cylindrical axis of symmetry, the correct position of the tip will be the one that corresponds to that which the length of the slit (i.e., its largest dimension) would occupy in an approximately horizontal axis.

The slit will be cut so as to define an angle (alpha) preferably between 100 and 115°, this angle alpha falling in the plane of the injector. The plane of the injector is itself defined as the plane simultaneously containing the axis of the injector and a horizontal axis. This condition on angle alpha makes it possible to guarantee a lateral opening of the slit less than 25% of the diameter of the hemisphere. This point is essential to limit erosion of the tip upon contact with the abrasive catalyst circulating in the reactor near said tip.

The exit speed of the droplets from the slit, relative to the external surface of said slit, will generally be between 85 and 100 m/s.

With this set of conditions, it has been shown experimentally on an industrial-scale injector that it is possible to obtain a remarkably homogeneous beam of droplets with respect to the size distribution of these droplets measured at different points in the beam. It has also been shown that erosion phenomena of the tip itself, which were often observed in industrial units, precisely at the lateral ends of the exit slit, are considerably reduced. This is indeed a surprising effect, because the idea that would come to one skilled in the art to reduce this erosion is to increase the surface area of the exit slit of the tip so as to reduce the exit speed of the droplets, while the solution arrived at here is contrary to that of limiting this surface area through the area given to the opening angle of the slit.

The technology that makes it possible to shape the jet of droplets downstream from the atomization device, a Venturi tube for atomizing the batch, has been the object of in-depth studies and experimentation to optimize the following points:

1—homogeneity of the jet, combined with the opening angle of the jet,

2—erosion of parts of the injector tip subjected to erosion.

The following examples, obtained using reduced models of industrial injectors at about ¼ scale, show that the geometry of the tip greatly affects shaping efficiencies and susceptibility to erosion. They also show that the Venturi injector, combined with a hemispherical tip, makes it possible to decouple the atomization from the shaping functions, with the positive result that has already been indicated, namely, the retention of good atomization quality, even if the tip is eroded, which is not the case with other devices.

FIRST EXAMPLE

Tests were conducted with an injector provided with a Venturi tube. It was possible to test, on this same injector and under identical flow conditions in the Venturi tube, tips of different shape, and to assess the impact of the tip on the shape and homogeneity of the jet produced.

The Venturi tube used for these tests had a diameter of 10 mm and was elongated by a conical divergent part whose exit diameter was 30 mm. Several tips were tested at the exit of the divergent part.

Tip (A) according to the invention is a hemispherical cap with an internal diameter of 30 mm, in which a rectangular slit 5.5 mm in width is pierced, with an opening angle alpha of 106° with respect to the center of the hemisphere. The thickness of the tip is constant throughout the hemisphere.

Tip (B) according to the invention has a rectangular slit of comparable dimension but is cut in a plane perpendicular to the divergent part, so that the material thickness or the tip thickness varies decreasingly from the edges of the slit to its center.

Tip (C), not according to the invention, is a hemispherical cap in which a slit 5.5 mm in width is pierced with an opening angle of 65°. The tip thickness is constant throughout the hemisphere. The results relative to tip C, compared to those of tips A and B, appear in FIG. 4.

The tests were conducted with water and air under liquid flow conditions at the throat of the Venturi tube equal to 4420 kg/s/m² and a mass flow rate of gas to liquid equal to about 5%.

Figure 3A:
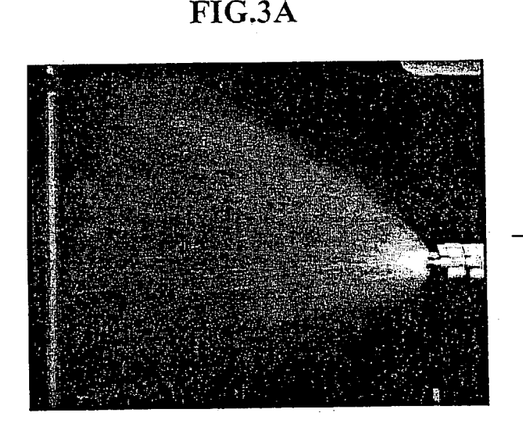
FIG. 3A is a photograph of a jet viewed from above, coming out of a tip according to the invention.

FIG. 3A shows a view from above of the jet formed with tip A (the largest slit dimension being in the plane of the photo). The jet appears visually to be homogeneous.

Figure 3B:
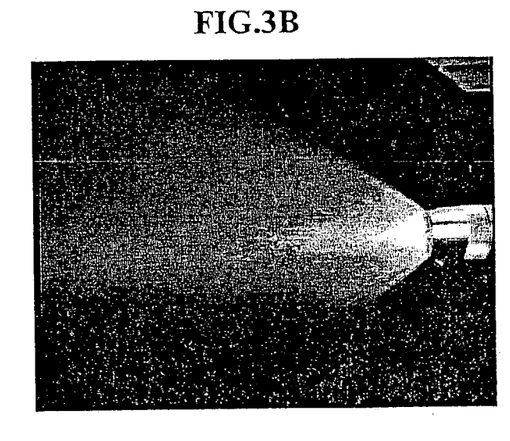
FIG. 3B is a photograph of a jet viewed from above, coming out of a tip not according to the invention but having a slit with a dimension similar to that of the tip according to the invention.

FIG. 3B shows a view from above of the jet formed with tip C (the largest dimension of the slit being in the plane of the photo). It is confirmed that the jet is less homogeneous, a white trail remaining at the center and suggesting a higher concentration of droplets in the axis of the injector.

So as to confirm these observations, quantitative measurements were performed by placing, under the injector (oriented downward), receptacles making it possible to collect and weigh the liquid during a given time at different positions of the jet. These positions are marked by a dispersion angle around the axis of the jet, this angle being located in the plane defined by the axis of the jet and the longest length of the slit of the tip. Flow WL is relative to the local flow measured in the axis of jet WLo. It is clear that tip A makes it possible to cover a larger opening of the jet by being more homogeneous, with a WL/WLo ratio between 0.8 and 1.2. In contrast, with tip C, the liquid flow is at maximum in the axis of the jet and rapidly decreases as soon as it distances itself from this axis. Tip B gives intermediate results, still satisfactory, between those of tip A and those of tip C.

Figure 4:
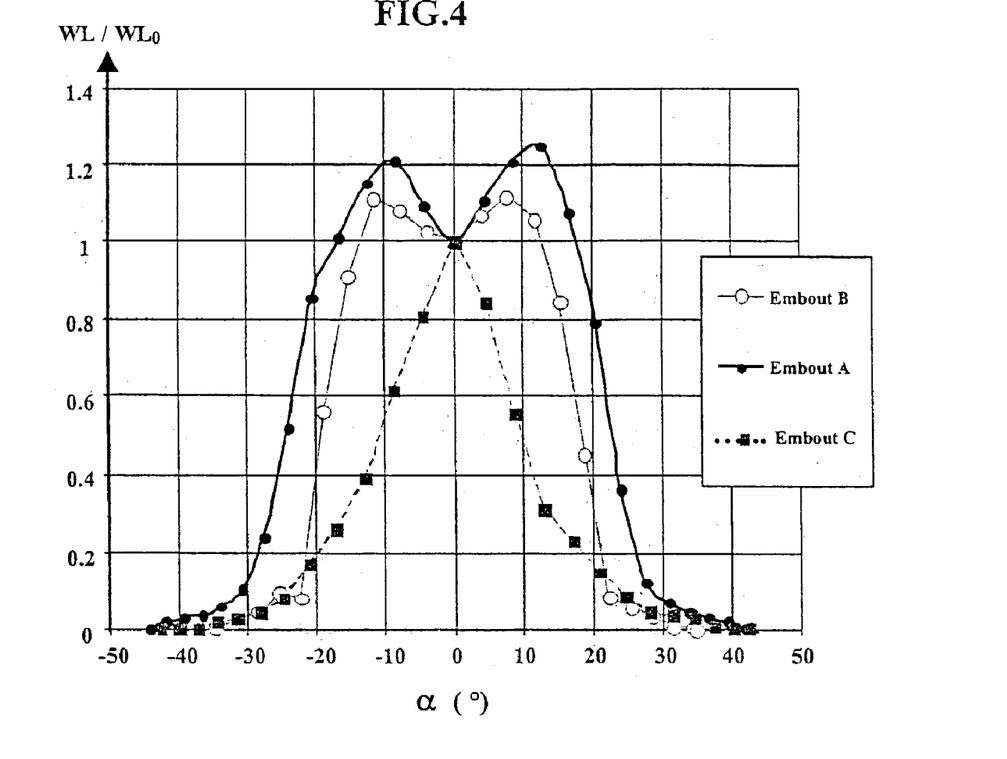
FIG. 4 is a comparison of local flows plotted with respect to a dispersion angle centered on the axis of the jet (i.e., value 0 of this angle corresponds to the axis of the jet). The flows are relative flows as they relate to the flow in the center. The comparison applies to three tips A; B; C, tip A and tip B being according to the invention, and tip C not being according to the invention.

The results, illustrated by FIG. 4 below, show clearly that the use of a hemispherical tip, according to the invention, i.e., with a slit opening with an angle preferably between 100 and 115°, the vertex of the angle being aligned with the center of the hemisphere, results in a jet that is clearly more homogeneous.

SECOND EXAMPLE

The second example illustrates the fact that a Venturi injector, combined with a tip, makes it possible to decouple the atomization function from the shaping function much more efficiently than with other types of atomization systems. The advantages that such a property confers have been shown, simultaneously in terms of batch loss of the tip, and in terms of maintaining the atomization performances of the injector if the tip erodes.

An injector provided with devices that make it possible to accelerate the fluids and the collision of the liquid with obstacles was tested with a hemispherical tip according to the characteristics described in this invention. The flow conditions of the liquid (water) in the tip were characterized by flows between 2000 and 5000 kg/s/m² at the slit of the tip with air throughputs between 2 and 7% by mass relative to the mass flow rate of the liquid. The device discharged the jet of droplets into the atmosphere. The batch loss obtained under these various conditions can be modeled in the form of:

$$\Delta P = 0.5 * 1.18 \rho_m V_m^2$$

A tip having the properties described in this invention was tested downstream from a Venturi tube with the characteristics described in this invention. The batch loss measured in the tip in the same range of conditions was:

$$\Delta P = 0.5 * 0.45 \rho_m V_m^2$$

$\rho_m$ and $V_m$ corresponding here to densities and speeds of a fluid phase equivalent to the gas-liquid mixture, and are calculated based on gas and liquid flow conditions by assuming that there is no shearing between the phases.

The reduction of batch loss in the case of the combination of a Venturi tube-tip according to the invention, compared with the combination of a collision atomization device-tip according to the invention, shows that the behavior of a tip downstream from an atomization device of the Venturi type is different from that which would be obtained with another device, and more precisely, the tip according to the invention combined with an atomization device of the Venturi type does not cause secondary atomization, which consumes energy.

THIRD EXAMPLE

The third example illustrates the impact of the shape of the tip on phenomena of tip erosion upon contact with the descending flow of particles in the reactor.

Figure 5:
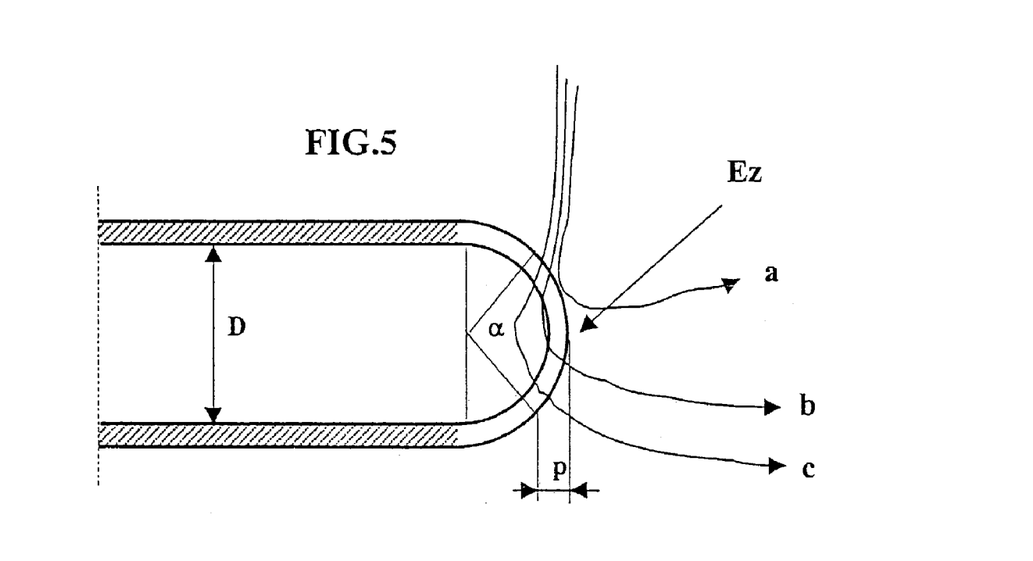
FIG. 5 is a diagram of the fluid current lines and of catalyst particles near a tip, which makes it possible to bring out a potential erosion zone (EZ) in connection with lateral penetration (p).

The jet of droplets coming from the tip causes a lateral suction effect on the particles which, under certain conditions, can penetrate the interior of the tip, as shown on FIG. 5 below where a top view of a cross section of a tip is shown. Considering the high speeds of the jet coming from the tip (typically 85 to 100 m/s) that are required to promote good contact between the droplets and the catalyst granules, a suction movement is inevitable near the tip, and can cause the catalyst to penetrate the interior of the tip, these catalyst particles being small, on the order of 100 microns, and thus easily carried along. These particles can then come into contact with the interior walls of the tip at relatively high speeds and erode the surfaces of the tip. It has been shown by mechanical calculations of multidimensional fluids (computational fluid dynamics) performed on different slit geometries, and in particular for different opening angles alpha, that the penetration of the catalyst into the space located inside the injector between the walls of the tip in the opening zone of the slit strongly depends on the p/D ratio (see FIG. 5 below), p designating the lateral penetration of the slit, which is connected to opening angle alpha and to diameter D of the hemisphere by the equation p=D/2*(cos alpha/2-1). If this ratio is less than 0.25, which corresponds to angles a between 100° and 115°, then it is impossible for the particles to penetrate the space located inside the injector between the walls of the tip (space called "erosion zone" in FIG. 5). In contrast, if this ratio is higher, it can be shown by the calculation that the particles can enter this space, rub against the internal surfaces of the tip and thus erode it.

For alpha that is advantageously between 100 and 115°, corresponding to a lateral penetration (p) between 0.18 and 0.23 times diameter D, the catalyst particles do not penetrate the interior of the tip no matter what their speed. These particles follow a trajectory of type (a).

For an alpha that is about 180°, corresponding to a lateral penetration (p) nearly 1 time diameter D, certain particles of the catalyst can penetrate the interior of the tip as is shown by trajectory (b) for relatively slow particles (2 m/s), and by trajectory (c) for relatively rapid particles (10 m/s).

Preferably alpha is selected to be between 105° and 113°.

The calculations were performed by simulating the entire geometry of the injector from the exit of the Venturi tube. The current lines were calculated by positing the hypothesis that the droplets would not modify the current lines of the gas (monophasic calculation). Once the current lines in the injector and its exit were calculated, the trajectory of the loose particles near the tip, at its exterior, were calculated (Lagrangian calculation, made with 5000 simultaneously loose particles).

These observations remain valid for an ascending flow of particles and no matter what the angle of introduction of the droplets by the injector.

The preceding examples can be repeated with similar success by substituting the generically or specifically described reactants and/or operating conditions of this invention for those used in the preceding examples.

The entire disclosure of all applications, patents and publications, cited herein and of corresponding French application No. 02/05.665, filed May 6, 2002, is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device for atomization and injection of a hydrocarbon batch into a reaction chamber, said device comprising:

an entry and mixing chamber (5) having a circular part (9), a tube (8) inside chamber (5) for introduction of a liquid hydrocarbon, and a conduit (18) for introduction of an atomization gas into said circular part (9) of chamber (5), a Venturi tube (6) having a convergent part (10) connected to circular part (9), of chamber (5), a throat (13) connected to convergent part (10), and a divergent part (14), connected to said throat (13), said divergent part (14) also being connected to a hemispheric tip (7), said tip having a rectangular slit (16) cut along a diameter of the tip through which a liquid hydrocarbon mixture in a state of droplets, and atomization gas, can be injected into a reaction chamber, said slit (16) having an opening angle alpha along the largest dimension of said rectangle of 100°–115°.

2. A device according to claim 1, wherein opening angle alpha is between 105°–113°.

3. A device according to claim 2, wherein slit (16) has a width/length ratio (e/L) of 0.1–0.55.

4. A device according to claim 2, wherein slit (16) has edges corresponding to smallest dimension (e) cut at an angle such that the sides of this angle meet at a point near the center of said hemispheric tip (7).

5. A device according to claim 1, wherein slit (16) has a width/length ratio (e/L) of 0.1–0.55.

6. A device according to claim 3, wherein slit (16) has edges corresponding to smallest dimension (e) cut at an angle such that the sides of this angle meet at a point near the center of said hemispheric tip (7).

7. A device according to claim 1, wherein slit (16) has edges corresponding to smallest dimension (e) cut at an angle such that the sides of this angle meet at a point approximately at the center of said hemispheric tip (7).

8. A device according to claim 1, wherein tube (8) is adapted to introduce a hydrocarbon batch along an axis near the axis of symmetry of said device.

9. A device according to any one of claim 1, wherein conduit (18) is adapted to introduce atomization gas into the circular space defined by said circular part (9) along an axis approximately perpendicular to the axis of said device.

10. A device according to claim 1, wherein throat (13) permits a mass flow rate liquid hydrocarbon of 1000–10000 $Kg/s/m^2$.

11. A device according to claim 7, wherein throat (13) ratio of mass flow rate of liquid hydrocarbon of 4000–6000 $Kg/s/m^2$.

12. A device according to claim 1, wherein slit (16) has a width/length ratio (e/L) of 0.2–0.5.

13. A reactor comprising a reaction chamber having a wall and an injector according to claim 1, wherein said injector is inclined at an angle, relative to the horizontal, of −80°–+80°.

14. A reactor according to claim 13, wherein said reactor comprises a plurality of said injectors positioned symmetrically on the periphery of the reaction chamber, wherein each of said injectors is inclined at an angle, relative to the horizontal, −80°–+80°.

15. A reactor according to claim 14, wherein each of said injectors is inclined at an angle, relative to the horizontal, of −70°–+70°.

16. A reactor comprising a reaction chamber having a wall and an injector according to claim 13, wherein said injector is inclined at an angle, relative to the horizontal, of −70°–+70°.

17. A device according to claim 1, wherein the length of the throat (13) of the Venturi tube (6) is 0.5–10 times the diameter of the throat (13).

18. A device according to claim 1, wherein tube (8) has exit openings (20) of located on the periphery of the tube, and the end of tube (8) is closed by a plug (15).

19. A device according to claim 1, wherein the ratio between the diameter of the throat of the Venturi tube and the internal diameter of the circular part (9) of the injector is 0.4–0.55.

* * * * *

UNITED STATES PATENT AND TRADEMARK OFFICE
CERTIFICATE OF CORRECTION

| | | |
|---|---|---|
| PATENT NO. | : 7,172,733 B2 | Page 1 of 1 |
| APPLICATION NO. | : 10/429952 | |
| DATED | : February 6, 2007 | |
| INVENTOR(S) | : Thierry Gauthier et al. | |

It is certified that error appears in the above-identified patent and that said Letters Patent is hereby corrected as shown below:

Column 12, line 34 reads "horizontal, -80°", should read --horizontal, of -80°--.

Signed and Sealed this

Twenty-first Day of August, 2007

JON W. DUDAS
*Director of the United States Patent and Trademark Office*